US006376572B1

(12) United States Patent
Turri

(10) Patent No.: US 6,376,572 B1
(45) Date of Patent: Apr. 23, 2002

(54) COMPOSITIONS FOR FILMS HAVING A LOW REFRACTIVE INDEX

(75) Inventor: Stefano Turri, Milan (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/584,496

(22) Filed: Jun. 1, 2000

(30) Foreign Application Priority Data

Jun. 3, 1999 (IT) .......................................... MI99A1246

(51) Int. Cl.[7] .............................. C08F 2/50; C08F 220/26
(52) U.S. Cl. ...................... 522/173; 522/181; 526/245
(58) Field of Search ............................... 522/173, 174, 522/181, 182; 526/245

(56) References Cited

U.S. PATENT DOCUMENTS

| | | | |
|---|---|---|---|
| 2,242,218 A | 5/1941 | Auer .............................. 91/70 |
| 3,242,218 A | 3/1966 | Miller ......................... 260/615 |
| 3,513,203 A | 5/1970 | Sianesi et al. ............... 260/594 |
| 3,665,041 A | 5/1972 | Sianesi et al. .......... 260/615 A |
| 3,715,378 A | 2/1973 | Sianesi et al. ............... 260/463 |
| 3,810,874 A | 5/1974 | Mitsch et al. .................. 260/75 |
| 3,847,978 A | 11/1974 | Sianesi et al. .............. 260/535 |
| 4,525,423 A | 6/1985 | Lynn et al. .................. 428/421 |
| 4,680,149 A | * 7/1987 | Rawlings et al. |
| 4,818,801 A | * 4/1989 | Rice et al. |
| 5,011,979 A | 4/1991 | Gregorio et al. ............ 560/223 |
| 5,834,564 A | * 11/1998 | Nguyen et al. |

FOREIGN PATENT DOCUMENTS

| | | |
|---|---|---|
| EP | 0 239 123 | 9/1987 |
| EP | 0 851 246 A | 7/1998 |
| EP | 0 863 128 A1 | 9/1998 |
| GB | 1104482 | 4/1965 |
| JP | 63-068542 | 3/1988 |
| WO | WO 96/31545 | * 10/1996 |
| WO | WO 96/31546 | * 10/1996 |

OTHER PUBLICATIONS

Derwent Publications Ltd., London, GB; Database WPI, Section Ch, Week 199846; Class A14, AN 1998–537721;XP002178883.

Derwent Publications Ltd., London, GB; Database WPI, Section Ch. Week 199923; Class A25, AN 1999–267107;XP002178882.

Priola, Aldo, et al., "UV–curable systems containing perfluoropolyether structures: synthesis and characterization," Macromol. Chem. Phys. 198. 1893–1907 (1997).

\* cited by examiner

*Primary Examiner*—Susan W. Berman
(74) *Attorney, Agent, or Firm*—Arent, Fox, Kintner, Plotkin & Kahn

(57) ABSTRACT

Use of a composition for preparing by radical route polymeric films having refractive index lower than 1.400, said composition comprising:

a) a perfluoropolyether of formula:

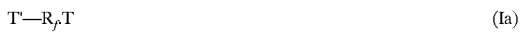

(Ia)

b) from 0.1 to 10% by weight of a perfluoropolyether of formula:

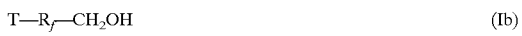

(Ib)

c) from 0 to 30% by weight of compounds selected from c1):
  compounds not containing fluorine: non fluorinated (meth)acrylic esters or vinyl monomers;
  or c2) compounds containing fluorine: mono(meth)acrylate perfluoropolyethers or perfluoroalkyl mono (meth)acrylates, d) from 0.01 to 10% by weight of a photoinitiator and/or radical initiators, the amount of component a) being the complement to 100 of the composition, with the proviso that defining by $B_0$ the mole number of —$CF_2CH_2OH$ and by $B_1$ the sum of the moles of the (meth)acrylic end groups, the $(B_0+B_1)/B_1$ ratio is in the range 1.50–1.01.

13 Claims, No Drawings

COMPOSITIONS FOR FILMS HAVING A LOW REFRACTIVE INDEX

The present invention relates to compositions which allow to obtain films having improved antireflection properties combined with good no dirt pick up surface properties, good hardness and abrasion-resistance and good chemical resistance (resistent to solvents).

It is known that in order to obtain a film having antireflection properties refractive index of the film must be lower than that of the substratum on which the film is applied. For this purpose films formed of fluorine containing polymers are particularly preferred, wherein it is known that the antireflection properties improve by increasing the fluorine content. See for example the Japanese patent application JP 63068542.

In the prior art, as antireflection films, films formed of fluoropolymers based on fluorinated mono-, bi- or polyfunctional methacrylates, or amorphous perfluoropolymers such as CYTOP® or TEFLON AF®, or TFE-, VDF- or HFP-based polymers or copolymers, have been used.

In the prior art it is also known that in order to obtain films wherein the antireflection effect is combined with good mechanical properties, it is necessary to use crosslinked polymers.

EP 863.128 describes antireflection films obtained by polyfunctional acrylates and methacrylates containing fluorine, wherein the antireflection properties combine with good mechanical properties when the refractive index $n_D$ of the film is higher than about 1.44. The materials on which the film is applied are transparent, and have refractive index of 1.55 or higher. No reference is made to the film surface properties as above mentioned.

In conclusion in the prior art polymer materials having antireflection characteristics, but not optimal in all the visible field, have been described, and besides a material having the combination of the above mentioned properties was not available.

The need was felt to have available crosslinkable materials having a low refractive index, with which it was possible to prepare films such as to confer substantially uniform antireflection properties in the whole visible field, for applications both to organic polymers with refractive index higher than or equal to 1.55, such as for example polyethylenterephthalate PET ($n_D$ 1.58) and polycarbonate ($n_D$ 1.55), and to those having a lower refractive index, such as for example polymethylmethacrylate PMMA ($n_D$ 1.44), said films combining improved antireflection properties with the following features:

good surface no dirt pick up properties, i.e. dirt is unlikely absorbed and can be easily removed, good mechanical properties, specifically the abrasion-resistance, improved chemical resistance, intended as resistance to atmospheric agents and resistance to solvents.

These property combinations are obtained by using the compositions according to the present invention.

The present invention relates to the use of resins or crosslinkable polymers having a low refractive index, lower than 1.400, preferably in the range 1.310–1.390, formed of perfluoropolyether chains with terminal functions of acrylic, methacrylic and hydroxyl type, said resins able to give crosslinked polymer films having a thickness in the range 0.1–100 microns, preferably 1–10 microns with the above mentioned properties.

An object of the present invention is the use of a composition for preparing by radical route polymer films having the above mentioned antireflection properties, said composition comprising:

a) a perfluoropolyether of the following formula:

   (Ia)

wherein:
T and T', equal to or different from each other, are selected from the following groups:
—$CF_2$—$CH_2$—O—CO—CR=$CH_2$,

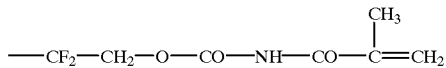

—$CF_2$—$CH_2$—O—CO—$R_I$—CR=$CH_2$ wherein:
R=H, $CH_3$;
$R_I$=—NH—$CH_2$—$CH_2$—O—CO— or NH—$R_{II}$—NHCOO—$CH_2$—$CH_2$—OCO—

$R_{II}$ being an aliphatic $C_3$–$C_{10}$, $C_5$–$C_{14}$ cycloaliphatic or alkylcycloaliphatic, $C_6$–$C_{14}$ aromatic or alkylaromatic radical; such as for example $C_6H_{12}$, hexamethylendiisocyanate aliphatic radical; $C_{10}H_{18}$, isophorondiisocyanate cycloaliphatic radical; $C_{13}H_{22}$, dicyclohexylmethandiisocyanate radical; $C_7H_6$, 2,6-toluendiisocyanate aromatic radical; $C_{13}H_{10}$, diphenylmethandiisocyanate radical;

$R_f$ is a fluoropolyether having a number average molecular weight from 400 to 5,000, preferably from 700 to 2,000, and it is selected from those having one or more of the following units statistically distributed along the chain: ($C_3F_6O$), (CFYO) wherein Y is F or $CF_3$, ($C_2F_4O$), ($CR_4R_5CF_2CF_2O$) wherein $R_4$ and $R_5$ are equal to or different from each other and selected from H, Cl and one fluorine atom of the perfluoromethylene unit can be substituted with H, Cl, or (per)fluoroalkyl having for example from 1 to 4 carbon atoms;

b) from 0.1 to 10% by weight, preferably from 1 to 5% by weight, of a perfluoropolyether having the following formula:

T—$R_f$—$CH_2OH$   (Ib)

wherein T and $R_f$ are as above defined;

c) from 0 to 30% by weight of reactive diluents, i.e., compounds which lower the composition viscosity, selected from the following:

(c1) compounds not containing fluorine, selected from the following:

c1a) mono-, bi-, polyfunctional non fluorinated (meth)acrylic esters, obtained by reaction of (meth)acrylic acid with the following hydroxylated compounds:

aliphatic oligoethers having the hydroxyl group at one or both terminations, formed by ($C_tH_{2t}O$)$_{nx}$ units wherein t is 2 or 3 and nx ranges from 2 to 5; examples of such esters are tripropylenglycoldi(meth)acrylate, diethylenglycoldi(meth)acrylate, ethoxyethoxyethyl(meth)acrylate;

mono-, polyhydroxylated aliphatic alcohols, with a number of hydroxyl functions from 1 to 4, linear or branched, with a number of carbon atoms between 2 and 18; examples of such esters such as for example ethylenglycoldi(meth)acrylate, butandioldi(meth)acrylate, hexandioldi(meth)acrylate, trimethylolpropantri(meth)acrylate, pentaerythritoltri(meth)acrylate, stearyl(meth)acrylate, ethylhexyl (meth)acrylate;

cyclo- or polycycloalipathic alcohols with a number of carbon atoms for each ring between 3 and 6, wherein the ring can optionally be substituted with one or more alkyl groups $C_1$–$C_3$; an example of isobornyl(meth)acrylate, or c1b) vinyl monomers, copolymerizable with the above mentioned (meth)acrylic esters c1a), such as for example (meth)acrylic acid, N-vinylpyrrolidone;

(c2) compounds containing fluorine, selected from the following:

c2a) mono(meth)acrylate perfluoropolyethers having the formula:

$$Y_ACF_2OR_{f'}CFX_pCH_2(OCH_2CH_2)_pOCOCR=CH_2 \quad (Ic2a)$$

wherein $Y_A$=F, Cl, $CF_3$, $C_2F_5$, $C_3F_7$, $C_4F_9$; and $X_p$=F, $CF_3$; R as above defined wherein p is zero or an integer from 1 to 5; $R_{f''}$ represents a radical having a perfluoropolyether structure with a number average molecular weight in the range 400–3,000, said radical being formed of sequences of alkylene oxyfluoro structures, such as for example the following units:

—$CF_2O$—, —$CF_2CF_2O$—, —$CF_2CF_2CF_2O$—, —$CF_2(CF_3)$—$CFO$—, —$(CF_3)CFO$—, —$CF_2CF_2CH_2O$—;

or c2b) perfluoroalkyl mono(meth)acrylates of formula:

$$(R_{fI})_{pI}QOCOCH=CH_2 \quad (Ic2b)$$

wherein $R_{fI}$ is a fluoroalkyl radical with $C_3$–$C_{30}$, preferably $C_3$–$C_{20}$, carbon atoms or a perfluoropolyether radical PFPE containing in the chain the units above mentioned in c2a) and having a number of carbon atoms from 5 to 30;

pI is 1 or 2;

Q is an aliphatic $C_1$–$C_{12}$ or aromatic $C_6$–$C_{12}$ divalent linking bridge; Q can optionally contain heteroatoms such as N, O, S, or carbonylimino, sulphonylimino or carbonyl groups; Q can be unsubstituted or is linked to substitutents selected from the following: halogen atoms, hydroxyl groups, alkyl radicals $C_1$–$C_6$; Q preferably does not contain double or triple bonds; preferably Q is selected from the following divalent radicals: —$CH_2$—, $C_2H_4$—, —$SO_2N(R^5)C_2H_4$—, —$SO_2N(R^5)CH_2CH(CH_3)$—, —$C_2H_4SO_2N(R^5)C_4H_8$—, $R^5$ is H or an alkyl $C_1$–$C_4$;

d) from 0.01 to 10% by weight of photoinitiator and/or radical initiators, the amount of component a) being the complement to 100% of the composition, with the proviso that defining by $B_0$ the mole number of the —$CF_2CH_2OH$ end groups and by $B_1$ the sum of the moles of the (meth)acrylic end groups, obtained by the sum of T+T' of the components a) and b), the $(B_0+B_1)/B_1$ ratio is in the range 1.50–1.01.

The compounds of formula (Ia) are obtainable by esterification reactions or reactions leading to the formation of bonds of urethane type, well known in the prior art.

The preferred fluoropolyethers in the formula (Ia) of the component a) are the following, wherein the perfluorooxyalkylene units are statistically distributed along the chain:

—$(C_3F_6O)_{m'}(CFYO)_{n'}$— a')

wherein the units $(C_3F_6O)$ and (CFYO) are perfluorooxyalkylene units statistically distributed along the chain; m' and n' are integers such as to give the above mentioned molecular weights, and m'/n' are comprised between 5 and 40, n' being different from 0; Y is F or $CF_3$; n' can also be equal to 0;

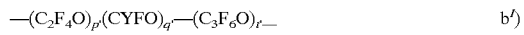
—$(C_2F_4O)_{p'}(CFYO)_{q'}$—$(C_3F_6O)_{t'}$— b')

wherein p' and q' are integers such that p'/q' ranges from 5 to 0.3, preferably from 2.7 to 0.5 and such that the molecular weight is within the above mentioned limits; t' is an integer with the meaning of m', Y=F or $CF_3$; t' can be 0 and q'/(q'+p'+t') is equal to 1/10 or lower and the t'/p' ratio ranges from 0.2 to 6;

—$CR_4R_5CF_2CF_2O$— c')

wherein $R_4$ and $R_5$ are equal to or different from each other and selected from H, Cl, the molecular weight such as to be within the above mentioned limits, and one fluorine atom of the perfluoromethylene unit can be substituted with H, Cl or perfluoroalkyl, having for example from 1 to 4 carbon atoms.

The perfluoropolyethers corresponding to the radical $R_f$ of the formula (Ia) are obtainable by known processes. See U.S. Pat. Nos. 3,665,041, 2,242,218, 3,715,378 and EP 239,123.

The components c2a) (compounds having formula (Ic2a)) can be prepared according to U.S. Pat. No. 5,011,979, herein incorporated by reference.

The methods for preparing the corresponding precursors are known. See for example U.S. Pat. Nos. 3,513,203; 3,847,978; 3,810,874.

Specifically, the perfluoropolyethers for obtaining the perfluoropolyethers-acrylates of formula (Ic2a) of the component c2a) are selected from those formed of perfluorooxyalkylene unit sequences as follows:

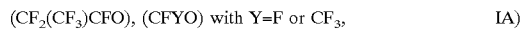
$(CF_2(CF_3)CFO)$, (CFYO) with Y=F or $CF_3$, IA)

said units being randomly distributed along the perfluoropolyether chain;

$(CF_2CF_2O)$, $(CF_2(CF_3)CFO)$, (CFYO), IIA)

Y being as above defined, said units being randomly distributed along the perfluoropolyether chain;

$(CF_2(CF_3)$—CFO); IIIA)

$(CH_2CF_2CF_2O)$; IVA)

$(CF_2CF_2CF_2O)$; VA)

$(CF_2CF_2O)$. VIA)

The perfluoropolyethers containing the perfluorooxyalkylene units above mentioned are preferably selected from the following classes:

$A'O(C_3F_6O)_m(CFYO)_n$— IB)

wherein Y is —F, —CF$_3$; A'=—CF$_3$, —C$_2$F$_5$, —C$_3$F$_7$,
the C$_3$F$_6$O and CFYO units are randomly distributed along the perfluoropolyether chain, m and n are integers, the m/n ratio is $\geq 2$,
these compounds ar obtained by hexafluoropropene photooxidation according to the process described in GB patent 1,104,482,

         (IIB)

wherein m is a positive integer, the average number molecular weight is that above mentioned for the perfluoropolyethers contained in the component c2a); the perfluoropolyethers are obtained by ionic telomerization of hexafluoropropene epoxide, such as for example described in U.S. Pat. No. 3,242,218,

         (IIIB)

wherein:
Y is as above mentioned; m, n and q, different from zero, are integers such that the number average molecular weight is at least 400, these compounds are obtainable by photooxidation of C$_3$F$_6$ and C$_2$F$_4$ mixtures by means of the processes described in U.S. Pat. No. 3,665,041.

The compounds c2b) of formula (Ic2b) are known. See U.S. Pat. No. 4,525,423.

By polymerization by radical route, the polymerization by thermal peroxidic or by cool photochemical route is to be intended.

Examples of photoinitiators are the benzoin compounds such as benzoinisopropylether, benzyldimethylketal, acetophenone compounds as diacetoxyacetophenone, benzophenone compounds such as benzophenone, benzoylbenzoic acid, hydroxybenzophenone, etc.

In order to prepare the invention film the components a), b) and d), and optionally c), are mixed and let react at room temperature.

It is preferable to obtain directly the components a) and b), by letting react the perfluoropolyether diol with a defect, calculated with respect to the moles of the hydroxyl end groups, of heterofunctional (meth)acrylic monomer, the heterofunctional (meth)acrylic monomer being a (meth)acrylic monomer having another reactive group besides the double ethylene bond (for example isocyanate ethylmethacrylate, acryloyl chloride, methacrylic anhydride, methacryloyl isocyanate, etc.).

The component c) is added to the composition if the composition viscosity comprising the mixture a)+b)+d) is too high for the kind of specific application, for example in the spin coating case.

By using the non fluorinated reactive diluents c1a) and/or c1b) as above defined, the increase of the composition refractive index is obtained. Preferably in the invention composition the fluorinated components c2a) and/or c2b), as above defined, are used in order to furtherly decrease the film refractive index.

As already said, the invention films combine improved antireflection properties in the whole visible spectrum as above indicated with the above mentioned properties.

The following examples are given with the only purpose to illustrate the invention and they do not limit the same.

EXAMPLE 1

In a 500 ml three-necked flask equipped with mechanical stirrer, thermometer and connection pipe to nitrogen, 400 g of perfluoropolyether diol having the structure

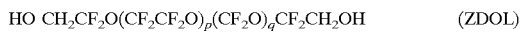         (ZDOL)

having p/q=0.84, hydroxyl equivalent weight 1037, 85.75 g of isophorondiisocyanate IPDI, and 1.71 ml of a 5% dibutyltin dilaurate DBTDL solution, are introduced. The mixture is heated under stirring for 2 hours at 50° C, until the complete conversion of the perfluoropolyetherdiol to the urethane prepolymer. The conversion is followed by $^{19}$F-NMR on the sample as such, monitoring the signal couple shift from −81, −83 ppm (signals of the CF$_2$—CH$_2$OH groups) to −78, =80 ppm (signals of the CF$_2$—CH$_2$O-urethane groups), respectively. Then 50.2 g of hydroxyethylmethacrylate HEMA, 0.05 g of hydroquinone and other 9 μl of a 5% DBTDL solution are added and heating is continued until the signal of the NCO group verified by IR spectroscopy (2260 cm$^{-1}$) disappears.

Finally 500 g of product having the following characteristics are obtained:
viscosity measured at 20° C.: 400,000 mPa.s (measured by an ARES A3/A25 rheogoniometer (Rheometrics), with parallel plates configuration in frequency sweep);
refractive index measured at 25° C.: 1,3652 (ASTM D233)

EXAMPLE 2

In a 250 ml three-necked flask equipped with mechanical stirrer, thermometer and connection pipe to nitrogen, 120 g of perfluoropolyether diol having equivalent weight 664, and 40.17 g of isophorondiisocyanate IPDI with 0.8 ml of a 5% DBTDL solution in ethyl acetate, are introduced. The mixture is heated for 2 hours at 50° C. and then 24.2 g of hydroxyethylmethacrylate HEMA and in sequence 0.0095 g of hydroquinone are added. Heating is continued at 60° C. for further 6 hours until the NCO group, verified by IR analysis as in the previous Example 1, disappears.

170 g of product having the following characteristics are discharged:
viscosity measured at 20° C.: 450 Pa.s (measured by an ARES A3/A25 rheogoniometer (Rheometrics), with parallel plates configuration in frequency sweep);
refractive index measured at 25° C.: 1,3912.

EXAMPLE 3

Example 1 is repeated, introducing in the flask 152.5 g of perfluoropolyether diol having equivalent weight 664 and 34 g of isocyanateethylmethacrylate (Fluorochem Ltd) with 1 ml of a 5% DBTDL solution in ethyl acetate. The mixture is heated at 50° C for 6 hours until disappearance in the IR spectrum of the band corresponding to the NCO group. The $^{19}$F-NMR analysis of the reaction product shows the presence of bands at −81, −83 ppm corresponding to unreacted —CF$_2$CH$_2$OH groups. In the same NMR spectrum the ratio between the signals corresponding to the urethane prepolymer (−78, −80 ppm) and the above mentioned signals is of 95/5 by moles.
Characteristics of the Product:
viscosity at 20° C.: 558 mPa.s
refractive index: n$_D$ 25° C.: 1.3450

EXAMPLE 4

In a 500 cc 4-necked flask equipped with mechanical stirrer, thermometer, condenser and dropping funnel, 200 mg of hydroquinone, 71 g of methacrylic anhydride and 0.5 ml of anhydrous pyridine are introduced. In the dropping funnel 200 g of hydroxyl monofunctional perfluoropolyether (equivalent weight 614) having the following structure formula:

are fed.

The solution is heated to 80° C. and the fluorinated alcohol is dropped into the solution in 4 hours. The reaction mixture is let ract for further 8 hours, then it is verified by $^{19}$F-NMR that the conversion is complete. The mixture is let cool and then 100 ml of perfluoroheptane are added to extract the reaction product. The solvent is evaporated under vacuum isolating 207 g of monofunctional methacrylate product.

Characteristics of the Product:

viscosity at 20° C.: 10 mPa.s (ASTM 2196)
refractive index $n_D$ 25° C.: 1.3335.

EXAMPLE 5

A formulation containing 50 parts of polymer of Example 1, 50 parts of polymer of Example 3, 20 parts of polymer of Example 4 and 1 phr of Darocure® 1173 (Merck) (photoinitiator) is spread, under the form of a thin film, by a suitable spreading-film bar, on a polycarbonate PC specimen (poly(oxycarbonyloxy-1,4-phenyleneisopropylidene-1,4-phenylene)), maintained in inert nitrogen atmosphere, and irradiated from a distance of 10 cm for 5 seconds with a vapour mercury lamp Helios Italquartz, power 500 W (specific power 80 W/cm), obtaining a transparent and crosslinked polymeric film, unsoluble in MEK, chloroform, 1,1,2 trichlorotrifluoroethane.

The specimen surface not coated by the fluorinated polyurethane acrylate is opacified by abrasive treatment with abrasive paper. The reflection spectra, obtained by measuring the reflected light at a 8° angle with respect to the direction perpendicular to the surface, have been recorded by a Perkin-Elmer (Lambda 2) spectrophotometer using an integrating sphere (Labsphere inc., RSA- PE-20).

The R% reflectance is defined as the reflected light amount taking as reference zero ($R_0$) the vacuum and as 100 ($R_{100}$) the reflection spectrum of a polished white body, given as a reference, on the basis of the following equation:

$$R=[(R_{measured}-R_0)/(100-R_0)]*R_{100}$$

From the spectra evaluation it is noticed that in the visible wave length range from 400 to 800 nm the application of the polymeric film according to the present invention lowers the total reflected light of more than 50% in comparison with the uncoated polycarbonate specimen.

EXAMPLE 6

Cleanability Test

On a polycarbonate specimen and a second polycarbonate specimen treated with the coating described in Example 5, 10 drops of a carbon black dispersion in water are deposited. The samples are dried in ventilated stove at 50° C. for 2 hours.

Of the 10 stains thus formed, 4 are dry removed with a dry cloth, the other 6 are removed by an ultrasound bath treatment in H$_2$O for 5 minutes. The cleanability effectiveness is evaluated by a comparative test, adopting the following evaluation scale:

A—complete removal of the stain/absence of halo
B—light halo
C—partial removal of the stain
D—persistence of the stain.

The obtained results are reported hereinafter:

|  | Polycarbonate | Polycarbonate + antireflection coating |
|---|---|---|
| Dry cleanability | B | B |
| Ultrasound bath | B | A |

The results of the cleanability test show that the coatings obtained according to the present invention combine good antireflection properties with the no-dirt pick up.

What is claimed is:

1. Composition for preparing by radical polymerization polymeric films having a refractive index lower than 1.400, said composition comprising:

a) a perfluoropolyether of the following formula:

  (Ia)

wherein:

T and T', equal to or different from each other, are selected from the group consisting of:
—CF$_2$—CH$_2$—O—CO—CR═CH$_2$,

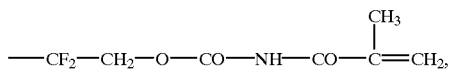

and
—CF$_2$—CH$_2$—O—CO—R$_f$—CR═CH$_2$
wherein:
R═H, CH$_3$;
R$_f$═—NH—CH$_2$—CH$_2$—O—CO— or
NH—R$_{II}$—NHCOO—CH$_2$—CH$_2$—OCO—
R$_{II}$ being an aliphatic C$_3$–C$_{10}$, C$_5$–C$_{14}$ cycloaliphatic or alkylcycloaliphatic, C$_6$–C$_{14}$ aromatic or alkylaromatic radical;
R$_f$ is a fluoropolyether having an number average molecular weight from 400 to 5,000, and is selected from those having one or more of the following units statistically distributed along the chain: (C$_3$F$_6$O), (CFYO) wherein Y is F or CF$_3$, (C$_2$F$_4$O), (CR$_4$R$_5$CF$_2$CF$_2$O) wherein R$_4$ and R$_5$ are equal to or different from each other and are H or Cl, and one fluorine atom of the perfluoromethylene unit can be substituted with H, Cl, or perfluoroalkyl having from 1 to 4 carbon atoms;

b) from 0.1 to 10% by weight, of a perfluoropolyether having the following formula:

  (Ib)

wherein T and R$_f$ are as above defined;

c) from 0 to 30% by weight of compounds selected from the group consisting of:
(c1) compounds not containing fluorine:
c1a) mono-, bi-, polyfunctional non fluorinated (meth)acrylic esters, obtained by reaction of (meth)acrylic acid with the following hydroxylated compounds:
aliphatic oligoethers having the hydroxyl group at one or both the terminations, formed by (C$_t$H$_{2t}$O)$_{nx}$ units wherein t is 2 or 3 and nx ranges from 2 to 5;

mono-, polyhydroxylated aliphatic alcohols, with a number of hydroxyl functions from 1 to 4, linear or branched, with a number of carbon atoms between 2 and 18;

cyclo- or polycycloalipathic alcohols having with a number of carbon atoms for each ring between 3 and 6, wherein the ring can optionally be substituted with one or more alkyl groups $C_1$–$C_3$; or c1b) vinyl monomers, copolymerizable with the (meth)acrylic esters c1a);

and c2) compounds containing fluorine, selected from the group consisting of:

c2a) mono (meth)acrylate perfluoropolyethers having the formula:

$$Y_A CF_2 OR_{f'} CFX_p CH_2(OCH_2CH_2)_p OCOCR=CH_2 \qquad (Ic2a)$$

wherein $Y_A$=F, Cl, $CF_3$, $C_2F_5$, $C_3F_7$, $C_4F_9$; and $X_p$=F, $CF_3$; R as above defined wherein p is zero or an integer from 1 to 5; $R_{f'}$to represents a radical having a perfluoropolyether structure with an number average molecular weight in the range 400–3,000, said radical formed of sequences of alkylene oxyfluoro structures, chosen from the following units:

$$-CF_2O-, -CF_2CF_2O-, -CF_2CF_2CF_2O-,$$

$$-CF_2(CF_3)-CFO-, -(CF_3)CFO-, -CF_2CF_2CH_2O-,$$

and c2b) perfluoroalkyl mono(meth)acrylates of formula:

$$(R_{fI})_{pI}QOCOCH=CH_2 \qquad (Ic2b)$$

wherein $R_{fI}$ is a fluoroalkyl radical having $C_3$–$C_{30}$, or a perfofluoropolyether radical (PFPE) containing in the chain the units mentioned in c2a) and having a number of carbon atoms from 5 to 30; pI is 1 or 2;

Q is an aliphatic $C_1$–$C_{12}$ or aromatic $C_6$–$C_{12}$ divalent linking bridge; Q optionally contains heteroatoms N, O, S, or carbonylimino, sulphonylimino or carbonyl groups; Q is unsubstituted or is linked to substituents selected from halogen atoms, hydroxyl groups, or alkyl radicals $C_1$–$C_6$;

d) from 0.1 to 10% by weight of photoinitiator and/or radical initiators, the amount of component a) being the complement to 100% of the composition, with the proviso that defining $B_0$ as the mole number of the —$CF_2CH_2OH$ terminals and $B_1$ as the sum of the moles of the (meth)acrylic end groups, obtained by the sum of T+T' of the components a) and b), the $(B_0+B_1)/B_1$ ratio is in the range 1.50–1.01.

2. The composition according to claim 1, wherein the fluoropolyethers in the formula (Ia) of the component a) are the following, wherein the perfluorooxyaylkylene units are statistically distributed along the chain:

a') —$(C_3F_6O)_{m'}(CFYO)_{n'}$— wherein the units $(C_3F_6O)$ and (CFYO) are perfluorooxyalkylene units statistically distributed along the chain; m' and n' are integers to give an number average molecular weight from 400 to 5,000, and m'/n' ranges from 5 to 40, n' being different from 0; Y is F or $CF_3$; n' can also be equal to 0;

b') —$(C_2F_4O)_{p'}(CYFO)_{q'}$—$(C_3F_6O)_{t'}$— wherein p' and q' are integers and p'/q' ranges from 5 to 0.3, to give an number average molecular weight from 400 to 5,000; t' is an integer with the meaning of m', Y=F or $CF_3$; t' can be 0 and q'/(q'+p'+t') is equal to 1/10 or lower and the t'/p' ratio ranges from 0.2 to 6; or c') —$CR_4R_5CF_2CF_2O$— wherein $R_4$ and $R_5$ are equal to or different from each other and are H or Cl, and one fluorine atom of the perfluoromethylene unit can be substituted with H, Cl or $C_1$–$C_4$ perfluoroalkyl.

3. The composition according to claim 2, wherein for b') —$(C_2F_4O)_{p'}(CYFO)_{q'}$—$(C_3F_6O)_{t'}$—, the p'/q' ranges from 2.7 to 0.5.

4. The composition according to claim 1, wherein the perfluoropolyethers for obtaining the perfluoropolyethers-acrylates of formula (Ic2a) of the component c2a) are selected from those formed of perfluorooxyalkylene unit sequences as follows:

$$(CF_2(CF_3)CFO), (CFYO) \text{ with } Y=F \text{ or } CF_3, \qquad IA)$$

said units being randomly distributed along the perfluoropolyether chain;

$$(CF_2CF_2O), (CF_2(CF_3)CFO), (CFYO), \qquad IIA)$$

Y being as above defined, said units being randomly distributed along the perfluoropolyether chain;

$$(CF_2(CF_3)-CFO); \qquad IIIA)$$

$$(CH_2CF_2CF_2O); \qquad IVA)$$

$$(CF_2CF_2CF_2O); \qquad VA)$$

and $$(CF_2CF_2O) \qquad VIA).$$

5. The composition according to claim 4, wherein the perfluoropolyethers are selected from the following classes:

$$A'O(C_3F_6O)_m(CFYO)_n— \qquad IB)$$

wherein Y is —F, —$CF_3$; A'=—$CF_3$, —$C_2F_5$, —$C_3F_7$; the $C_3F_6O$ and CFYO units are randomly distributed along the perfluoropolyether chain, m and n are integers, the m/n ratio is $\geq 2$, $$C_3F_7O(C_3F_6O)_m—, \qquad IIB)$$

wherein m is a positive integer, the number average molecular weight is in the range 400–3,000; and $$(C_3F_6O)_m(C_2F_4O)_n(CFYO)_q \qquad IIIB)$$

wherein:

Y is as above mentioned; m, n and q, different from zero, are integers and the average number molecular weight is at least 400.

6. The composition according to claim 1, wherein the polymer film of the invention is prepared by mixing and reacting the components a), b) and d), and optionally c).

7. The composition according to claim 6, wherein the components a) and b) are directly obtained from the perfluoropolyether diol by reaction with an amount lower than the stoichoimetric, with respect to the moles of the hydroxyl end groups, of (meth)acrylic monomer having in the molecule another reactive group besides the double ethylene bond.

8. The composition according to claim 1, wherein the polymeric films have a refractive index in the range 1.310–1.390.

9. The composition according to claim 1, wherein for a), $R_f$ is a fluoropolyether having an number average molecular weight from 700 to 2,000.

10. The composition according to claim 1, wherein for b), the perfluoropolyether of formula (Ib) is from 1 to 5% by weight.

11. The composition according to claim 1, wherein for (c2b), $R_{f1}$ is a fluoroalkyl radical having $C_3$–$C_{20}$ carbon atoms.

12. The composition according to claim 1, wherein for (c2b), Q has an absence of double or triple bonds.

13. The composition according to claim 1, wherein for (c2b), Q is selected from the group consisting of the following divalent radicals: —$CH_2$—, —$C_2H_4$—, —$SO_2N(R^5)$ $C_2H_4$—, —$SO_2N(R^5)CH_2CH(CH_3)$—, and —$C_2H_4SO_2N(R^5)C_4H_8$—, wherein $R^5$ is H or and alkyl $C_1$–$C_4$.

* * * * *